(12) United States Patent
Lamboy et al.

(10) Patent No.: US 9,399,922 B2
(45) Date of Patent: Jul. 26, 2016

(54) NON-INTEGRAL FAN BLADE PLATFORM

(71) Applicant: General Electric Company, Schenectady, NY (US)

(72) Inventors: Jorge Orlando Lamboy, Liberty Township, OH (US); Matthew Glen Gann, South Lebanon, OH (US); Nicholas Joseph Kray, Mason, OH (US); Gerald Alexander Pauley, Hamilton, OH (US); Daniel Allen Wilkin, II, West Chester, OH (US); Ming Xie, Beavercreek, OH (US)

(73) Assignee: General Electric Company, Schenectady, NY (US)

( * ) Notice: Subject to any disclaimer, the term of this patent is extended or adjusted under 35 U.S.C. 154(b) by 703 days.

(21) Appl. No.: 13/731,459

(22) Filed: Dec. 31, 2012

(65) Prior Publication Data

US 2014/0186187 A1    Jul. 3, 2014

(51) Int. Cl.
*F01D 5/30* (2006.01)
*F01D 11/00* (2006.01)
(Continued)

(52) U.S. Cl.
CPC ............ *F01D 5/3038* (2013.01); *F01D 5/3007* (2013.01); *F01D 11/008* (2013.01); *F02K 3/06* (2013.01); *F04D 29/321* (2013.01); *F04D 29/644* (2013.01); *F05D 2220/36* (2013.01); *F05D 2260/30* (2013.01); *Y02T 50/672* (2013.01); *Y10T 29/4932* (2015.01)

(58) Field of Classification Search
CPC .. F01D 5/3007; F01D 5/3015; F05D 2240/80

USPC ..................................................... 416/193 A
See application file for complete search history.

(56) References Cited

U.S. PATENT DOCUMENTS 5,540,552 A    7/1996  Surdi
6,145,300 A   11/2000  Romani
(Continued)

FOREIGN PATENT DOCUMENTS

EP   2098689 A2    9/2009
EP   2287446 A2    2/2011
WO   9321425 A1   10/1993

OTHER PUBLICATIONS

International Search Report and Written Opinion issued in connection with corresponding PCT Application No. PCT/US2013/076935 on Jul. 10, 2014.

*Primary Examiner* — Nathaniel Wiehe
*Assistant Examiner* — Cameron Corday
(74) *Attorney, Agent, or Firm* — General Electric Company; William Scott Andes (57) ABSTRACT

Described are a gas turbine engine fan blade platform, related rotor assembly and gas turbine engine, as well as a method of assembling the same. The platform has a forward portion proximal to an axis of rotation, an aft portion, and a transition portion between the forward and aft portions. The forward portion has a forward interface surface facing axially forward, the aft portion has an aft interface surface facing radially outward, and the transition portion has at least one mounting feature. For the method of assembly, an aft support is installed on a fan disk and booster spool assembly. A plurality of fan blades are installed into a fan disk, followed by installing a fan platform between adjacent blades and securing the mounting features to the disk, thereby filling the annulus of the fan disk. Finally, a forward support is installed on the fan disk.

11 Claims, 10 Drawing Sheets

(51) Int. Cl.
*F02K 3/06* (2006.01)
*F04D 29/32* (2006.01)
*F04D 29/64* (2006.01)

(56) References Cited

U.S. PATENT DOCUMENTS

| | | |
|---|---|---|
| 6,447,250 B1 | 9/2002 | Corrigan et al. |
| 6,726,452 B2 | 4/2004 | Strassberger et al. |
| 7,407,368 B2 | 8/2008 | Tanaka |
| 7,918,652 B2 | 4/2011 | Fujimura |
| 7,950,899 B2 | 5/2011 | Euvino, Jr. et al. |
| 8,215,910 B2 | 7/2012 | Belmonte et al. |
| 8,297,931 B2 | 10/2012 | Read et al. |
| 8,438,832 B1 | 5/2013 | Brilliant et al. |
| 8,529,204 B2 | 9/2013 | Bagnall |
| 2010/0290910 A1 | 11/2010 | Hoyland et al. |
| 2011/0038731 A1* | 2/2011 | Evans ............... F01D 5/06 416/220 R |
| 2011/0146299 A1 | 6/2011 | Hoyland et al. |
| 2014/0227088 A1 | 8/2014 | Beaujard et al. |
| 2014/0286781 A1 | 9/2014 | Billings et al. |

* cited by examiner

NON-INTEGRAL FAN BLADE PLATFORM

BACKGROUND OF THE INVENTION

The subject matter disclosed herein relates generally to components and assemblies of gas turbine engines, and more particularly to such components and assemblies used in bypass fans.

A turbofan gas turbine engine used for propelling an aircraft includes a fan assembly having a plurality of circumferentially spaced apart fan blades extending radially outwardly from a rotor disk. Airflow is channeled between the blades and pressurized thereby for generating thrust for powering the aircraft. The fan assembly typically includes a plurality of circumferentially spaced apart fan blades each having a dovetail root disposed in a complementary, axially extending dovetail groove or slot in a perimeter or rim of a rotor disk. The dovetail grooves are defined by dovetail posts and are complementary in configuration with the blade dovetail roots for radially retaining the blades to the rotor disk. The blades are also axially retained in the rotor disk to prevent axial movement of the blades in the upstream and downstream directions. A spinner is mounted to a front end of the fan assembly to provide smooth airflow into the fan. A radially inner flowpath boundary for the airflow channeled between the blades is provided typically by integral or non-integral platforms at the blade roots.

It is often a goal to increase airflow through the fan assembly to increase thrust. This thrust increase may be accomplished by increasing the radius of the fan blade tip. However, this fan blade change impacts both a rotating airfoil and the radially adjacent fan case, adding weight at a high radial location that must be borne by the fan assembly rotor hardware during operation. Other options exist to increase airflow without increasing the fan blade tip radius. The inner flowpath boundary, often referred to as the hub, can be moved radially inwardly thus getting designated as a low radius hub. However, low radius hubs present assembly challenges between the platforms and disk as the inner flowpath boundary tends to meet the top of the disk dovetail posts at the forward end of the disk, thus limiting the space for platform interface and mounting features.

Additionally, fan assemblies, in particular fan blades, are tested against various impact and high dynamic loading events, such as bird impacts and loss of fan blade events. It is often a goal to minimize the portion of a fan blade released during such impacts and events. During these events, the platform generally makes contact with the fan blade surface, raising the opportunity for fan blade damage and potential release of fan blade portions. It would be desirable to minimize the damage and potential release of fan blade portions.

There remains a need for an improved fan platform that incorporates features to permit a low radius hub design while minimizing the damage and potential release of fan blade portions during bird impacts and loss of fan blade events.

BRIEF DESCRIPTION OF THE INVENTION

Described is a gas turbine engine fan blade platform that is located between fan blades, above a fan disk, and is a component in a rotor assembly. The rotor assembly is used in the bypass fan of a gas turbine engine. The platform has a forward portion proximal to an axis of rotation, an aft portion, and a transition portion between the forward and aft portions. The forward portion has a forward interface surface facing axially forward, the aft portion has an aft interface surface facing radially outward, and the transition portion has at least one mounting feature.

Also described is a method of assembling a gas turbine engine rotor assembly, whereby an aft support is installed on a fan disk and booster spool assembly. A fan blade is then installed into the fan disk, followed by the installation of another fan blade into the disk, just adjacent to the first. A fan platform is then installed to fill the gap between adjacent fan blades and the mounting featured is secured to the disk. The installation of fan blades and fan platforms is repeated to fill the annulus of the disk. Finally, a forward support is installed onto the fan disk.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

Figure 1:
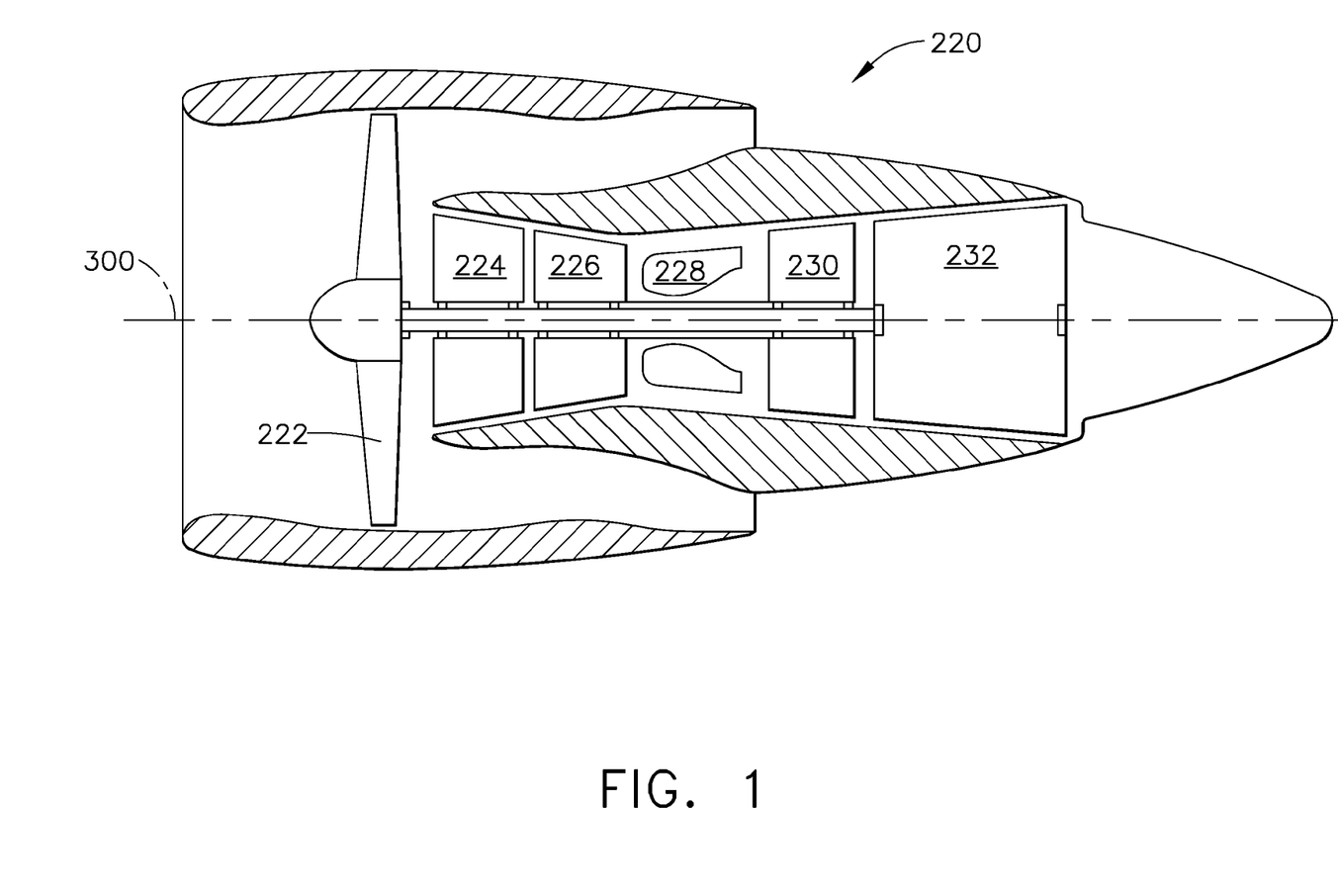
FIG. 1 shows schematic illustration of a gas turbine engine having a bypass fan.

FIG. 1 is provided for orientation and to illustrate selected components of a gas turbine engine 220 which includes a bypass fan 222, a low pressure compressor 224, a high pressure compressor 226, a combustor 228, a high pressure turbine 230 and a low pressure turbine 232.

Figure 2:
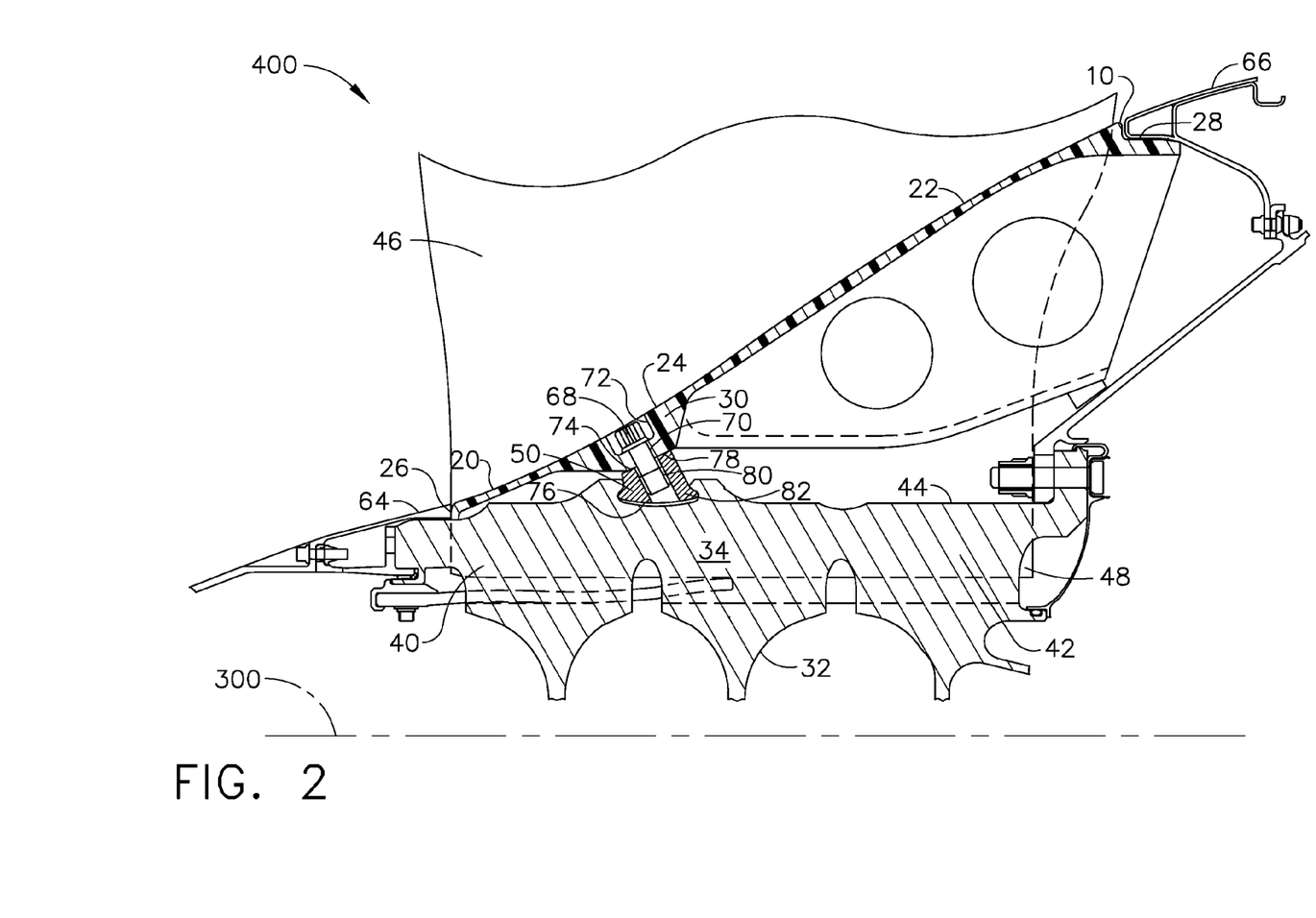
FIG. 2 is a cross-sectional view of a gas turbine engine bypass fan with an exemplary embodiment of a gas turbine engine rotor assembly.

Referring to FIG. 2, illustrated is a cross-sectional view of a gas turbine engine bypass fan 222 with an exemplary embodiment of a gas turbine engine rotor assembly 400. The rotor assembly 400 includes a disk 32 circumscribing an axis of rotation 300 from which extends radially outward a single axially located row of circumferentially spaced apart fan blades 46. Radially outward from the disk 32 and circumferentially positioned between adjacent fan blades 46 are fan blade platforms 10. Each fan blade platform 10 has an axially forward facing forward interface surface 26 in axial end to end contact with a forward support 64 and a radially outward facing aft interface surface 28 in radial contact with an aft support 66. Additionally, each fan blade platform 10 has a forward portion 20 proximal to axis of rotation 300, an aft portion 22, and a transition portion 24 connecting the forward portion 20 to the aft portion 22. The transition portion 24 has a mounting feature 30. In this exemplary embodiment, the mounting feature 30 has increased section thickness in comparison to the forward portion 20 and aft portion 22, a clearance hole 70 running through the mounting feature 30, and a counterbore 72. The clearance hole 70 and counterbore 72 are concentric and their shared centerline is approximately orthogonal to the radially outer surface of the transition portion 24. Along its maximum section thickness, mounting feature 30 further includes a radially inward mounting surface 74 approximately orthogonal to the centerline of the clearance hole 70.

Again referring to FIG. 2, disk 32 has a forward disk end 40, an aft disk end 42, a disk rim 34, and an outer surface of the rim 44. In this exemplary embodiment, near the forward disk end 40, the outer surface of the rim 44 is raised radially outward to form a circumferential dovetail slot 76 that runs circumferentially across the rim 34. Paired with each mounting feature 30 is an attachment member 50 having a radially outward mounting surface 78 mating to the radially inward mounting surface 74, a staked threaded insert 80 and a dovetail shaped radially inboard end 82. The attachment member 50 is inserted into the circumferential dovetail slot 76 and then a fastener 68, a shear bolt, passes through the mounting feature 30 and is threaded into threaded insert 80, thereby aligning and affixing the fan platform 10 to the attachment member 50 and coupling them to the disk 32 by way of the dovetail shaped radially inboard end 82 and circumferential dovetail slot 76.

The radial assembly gap between the bottom of circumferential dovetail slot 76 and the dovetail shaped radially inboard end 82 can range between about 0.013 cm to 0.38 cm, as desired, with this exemplary embodiment being about 0.13 cm. As desired, the circumferential shape of the circumferential dovetail slot 76, the mating dovetail shaped radially inboard end 82, and the radial assembly gap permit the platform 10 to move circumferentially relative to the disk 32 during impact and dynamic loading events. Additionally, the interfaces of fan platform 10 with the forward support 64 and aft support 66 are fastenerless and also permit circumferential relative movement with the disk 32 during impact and dynamic loading events.

In all of the Figures which follow, like reference numerals are utilized to refer to like elements throughout the various embodiments depicted in the Figures.

Figure 3:
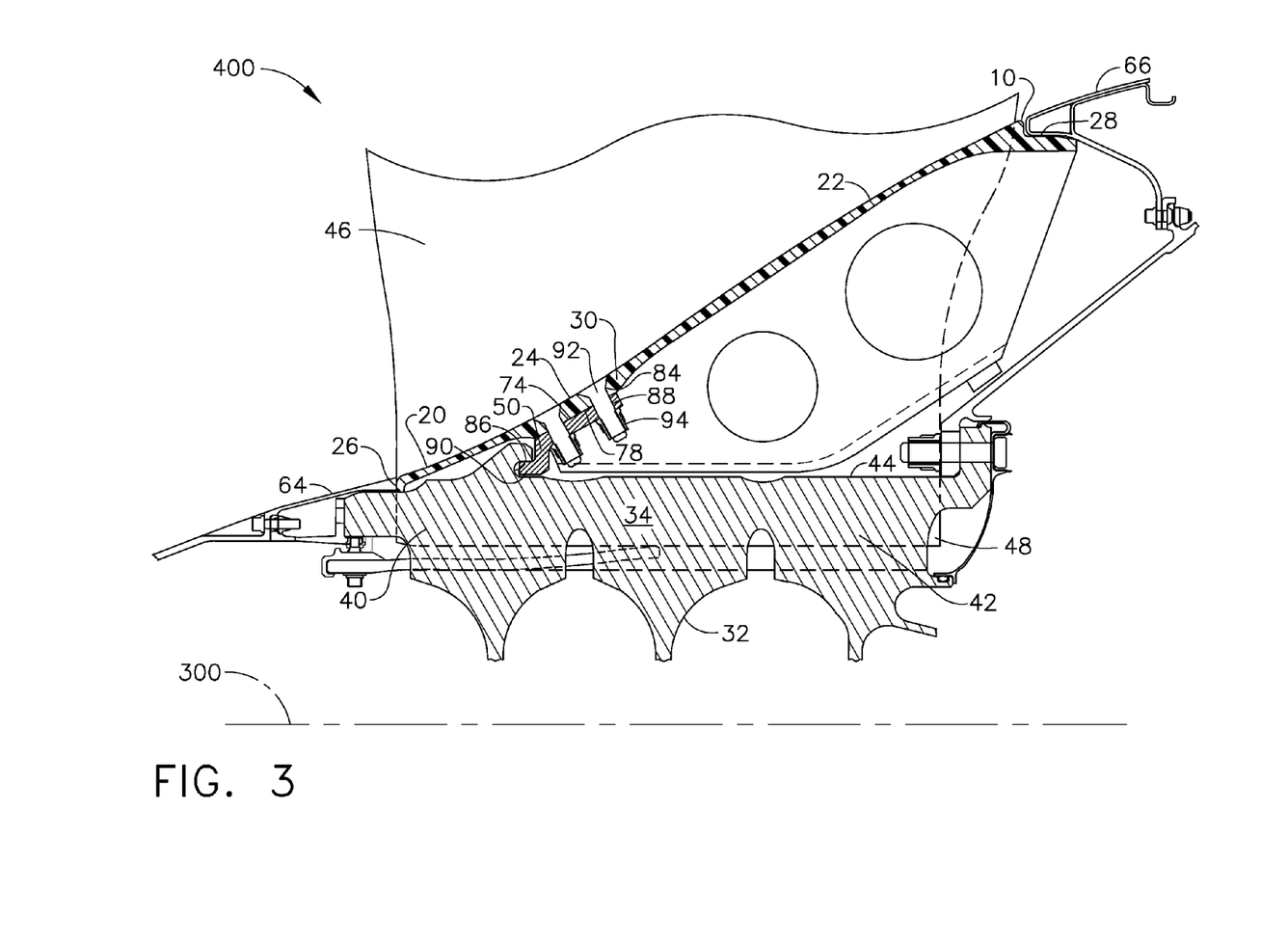
FIG. 3 is a cross-sectional view of a gas turbine engine bypass fan with an alternative exemplary embodiment of a gas turbine engine rotor assembly.

Referring now FIG. 3, illustrated is a cross-sectional view of a gas turbine engine bypass fan 222 with an alternative exemplary embodiment of a gas turbine engine rotor assembly 400. In this exemplary embodiment, the mounting feature 30 has increased section thickness in comparison to the forward portion 20 and aft portion 22 and a pair of countersunk holes 84 running through the mounting feature 30. The countersunk holes 84 centerlines are approximately orthogonal to the radially outer surface of the transition portion 24. Along its maximum section thickness, mounting feature 30 further includes a radially inward mounting surface 74 approximately orthogonal to the centerlines of the countersunk holes 84.

Again referencing FIG. 3, near the forward disk end 40, the outer surface of the rim 44 is raised radially outward and then axially forward to form a channel 86 that runs circumferentially across the rim 34. Paired with each mounting feature 30 is an attachment member 50, having a radially outward mounting surface 78 mating to the radially inward mounting surface 74, a pair of through holes 88, and an axially forward extending lip 90. The attachment member 50 is inserted into the channel 86 and then countersunk fasteners 92 pass through mounting feature 30 and are threaded into nuts 94, thereby aligning and affixing the fan platform 10 to the attachment member 50 and coupling them to the disk 32 by way of the channel 86 and the axially forward extending lip 90.

The radial assembly gap between of the axially forward extending lip 90 and the outer surface of the rim 44 can range between about 0.013 cm to 0.38 cm, as desired, with this exemplary embodiment being about 0.13 cm. The circumferential shape of the channel 86, the mating axially forward extending lip 90, and the radial assembly gap permit the platform 10 to move circumferentially relative to the disk 32 during impact and dynamic loading events, as desired. Additionally, the portions of the fan platform 10 interfacing with the forward support 64 and aft support 66 are adapted to be fastenerless and also thereby permit circumferential relative movement with the disk 32 during impact and dynamic loading events.

Figure 4:
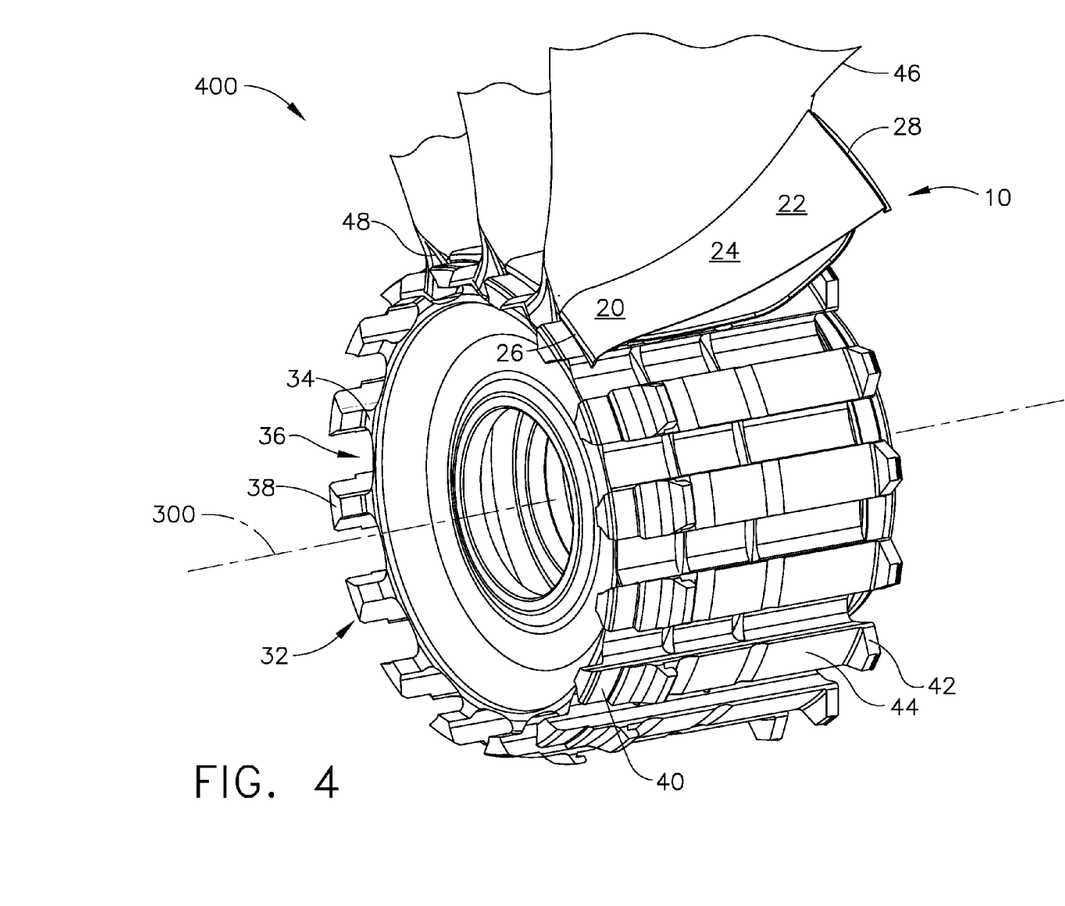
FIG. 4 is a perspective view of the disk, fan platform, and fan blade of FIG. 3.

FIG. 4 illustrates the perspective view of the alternative exemplary embodiment of the rotor assembly 400 of FIG. 3, describing the radially outward positioning of the fan platform 10 and fan blade 46 relative to the disk 32. Also described are features of the disk 32 including sixteen circumferentially spaced dovetail slots 36 disposed about the rim 34, extending circumferentially between disk posts 38, extending axially from a forward disk end 40 to an aft disk end 42, and extending radially inward from a disk outer surface of the rim 44. For this alternative exemplary embodiment, a complimentary set of sixteen fan blades 46 having dovetail roots 48 disposed in the dovetail slots 36 and circumferentially adjacent fan platforms 10 would be present, however, to better describe the alternative exemplary embodiment of the rotor assembly 400, only three fan blades 46 and fan platforms 10 are illustrated. Although sixteen slots 36 and blades 46 are described, any number of slots 36, platforms 10, and blades 46 could be utilized in the rotor assembly 400. Further details of the fan platform 10 described in FIG. 4 include the forward interface surface 26, the aft interface surface 28, the forward portion 20 being proximal to an axis of rotation 300, the aft portion 22, and the transition portion 24 connecting the forward portion 20 to the aft portion 22. The radially outer surfaces of these portions form the inner flowpath boundary between fan blades 46.

Figure 5:
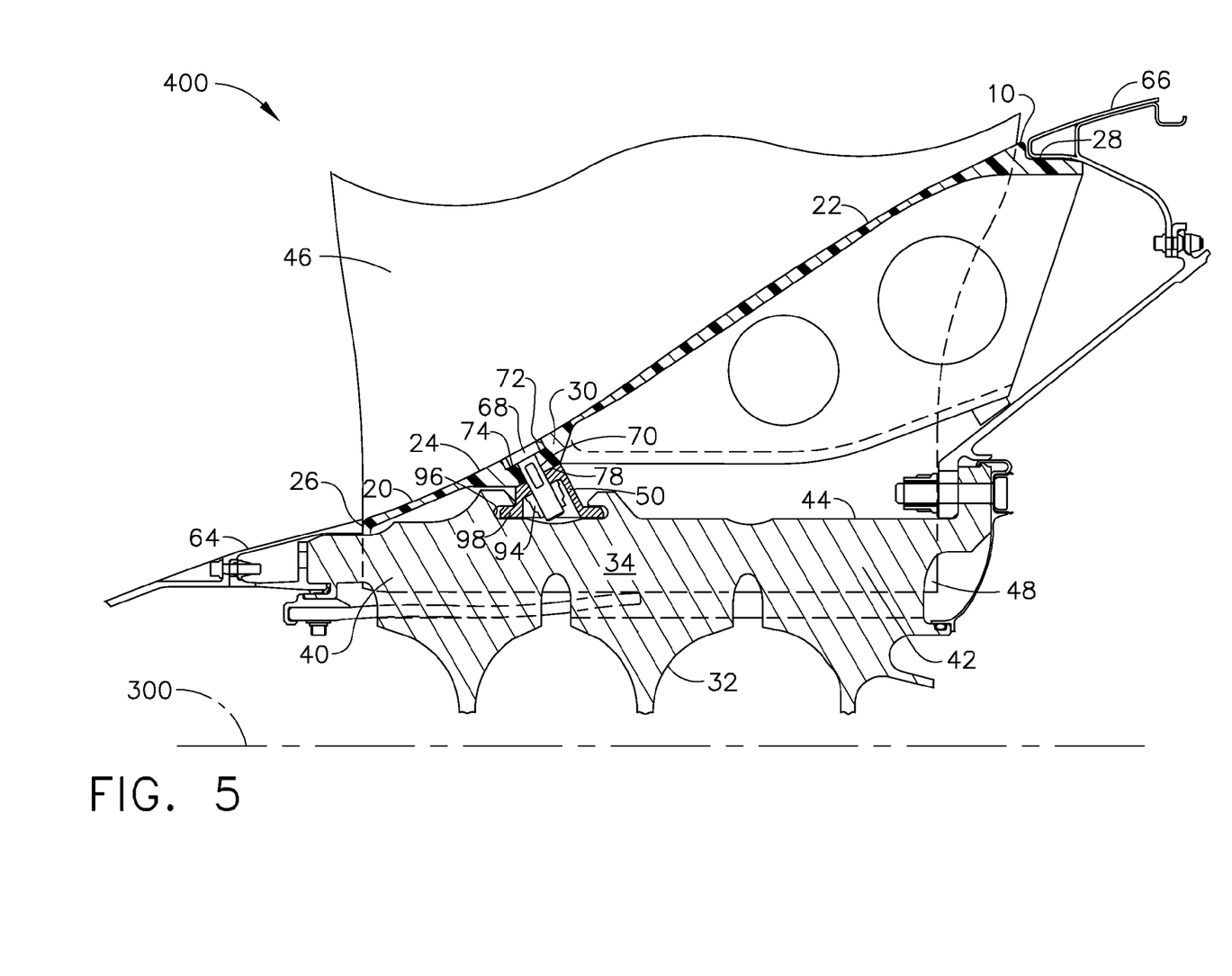
FIG. 5 is a cross-sectional view of a gas turbine engine bypass fan with another alternative exemplary embodiment of a gas turbine engine rotor assembly.

Referring now to FIG. 5, illustrated is a cross-sectional view of a gas turbine engine bypass fan 222 with another alternative exemplary embodiment of a gas turbine engine rotor assembly 400. In this exemplary embodiment, the mounting feature 30 has increased section thickness in comparison to the forward portion 20 and aft portion 22, a clearance hole 70 running through the mounting feature 30, and a counterbore 72. The clearance hole 70 and counterbore 72 are concentric and their shared centerline is approximately orthogonal to the radially outer surface of the transition portion 24. Along its maximum section thickness, mounting feature 30 further includes a radially inward mounting surface 74 approximately orthogonal to the centerline of the clearance hole 70.

Again referring to FIG. 5, near the forward disk end 40, the outer surface of the rim 44 is raised radially outward to form a circumferential aperture 96 that runs circumferentially across the rim 34. Paired with each mounting feature 30 is an attachment member 50, having a radially outward mounting surface 78 mating to the radially inward mounting surface 74, and an arch shaped cross-section having opposing interface ends 98. The attachment member 50 is inserted into the circumferential aperture 96 and then fastener 68, a flat-head shear bolt, passes through the mounting feature 30 and is threaded into nut 94, thereby aligning and affixing the fan platform 10 to the attachment member 50 and coupling them to the disk 32 by way of the opposing interface ends 98 and the circumferential aperture 96.

The radial assembly gap between the bottom of circumferential aperture 96 and opposing interface ends 98 can range between about 0.013 cm to 0.38 cm, as desired, with this exemplary embodiment being about 0.13 cm. As desired, the circumferential shape of the circumferential aperture 96, the mating opposing interface ends 98, and the radial assembly gap permit the platform 10 to move circumferentially relative to the disk 32 during impact and dynamic loading events. Additionally, the portions of the fan platform 10 interfacing with the forward support 64 and aft support 66 are adapted to be fastenerless and also thereby permit circumferential relative movement with the disk 32 during impact and dynamic loading events.

Figure 6:
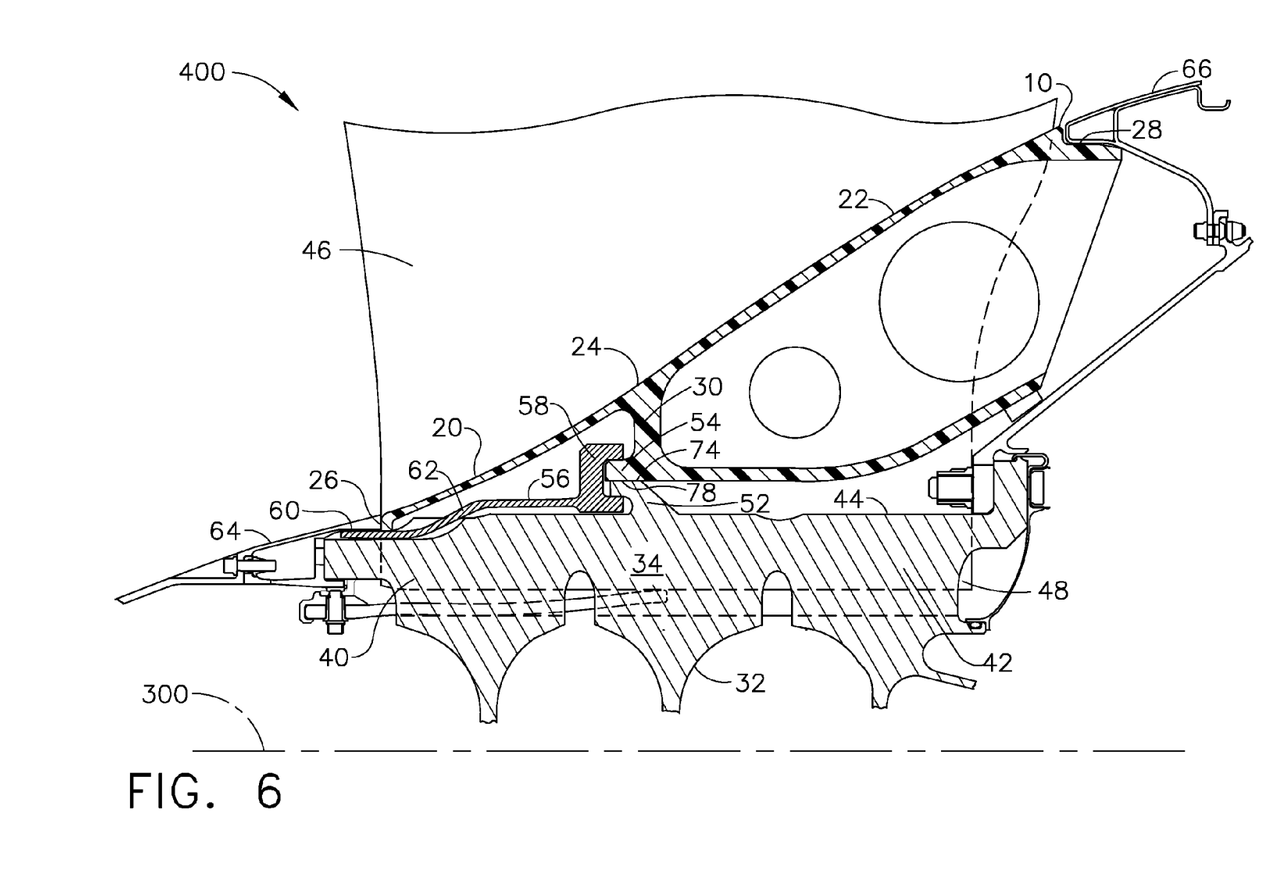
FIG. 6 is a cross-sectional view of a gas turbine engine bypass fan with another alternative exemplary embodiment of a gas turbine engine rotor assembly.

Moving now to FIG. 6, illustrated is a cross-sectional view of a gas turbine engine bypass fan 222 with another alternative exemplary embodiment of a gas turbine engine rotor assembly 400. In this exemplary embodiment, the mounting feature 30 has engagement tang 54 extending radially inward and axially forward. The most radially inward surface of the mounting feature 30 further includes a radially inward mounting surface 74 approximately parallel with the axis of rotation 300.

Again referring to FIG. 6, near the forward disk end 40, the outer surface of the rim 44 is raised radially outward to form a disk post hook 52 that runs circumferentially across the rim 34. Disk post hook 52 has a radially outward surface 78 mating to the radially inward mounting surface 74. A captured clip 56 having an engagement end 58, a captured end 60, and bridge portion 62, connecting the captured end 60 to the engagement end 58, is located radially outward of the outer surface of the rim 44 and radially inward of the forward portion 20 of the fan platform 10. The engagement end 58 is c-shaped in cross-section and is assembled with the engagement tang 54 and disk post hook 52 thereby aligning and coupling the fan platform 10 to the disk 32.

The radial assembly gap between the bottom of engagement end 58 and the outer surface of the rim 44 can range between about 0.013 cm to 0.38 cm, as desired, with this exemplary embodiment being about 0.13 cm. As desired, the circumferential shape of the disk post hook 52, the mating engagement tang 54, engagement end 58, and the radial assembly gap permit the platform 10 to move circumferentially relative to the disk 32 during impact and dynamic loading events. Additionally, the portions of the fan platform 10 interfacing with the forward support 64 and aft support 66, as well as the mounting feature 30, are all adapted to be fastenerless and also thereby permit circumferential relative movement with the disk 32 during impact and dynamic loading events.

Figure 7:
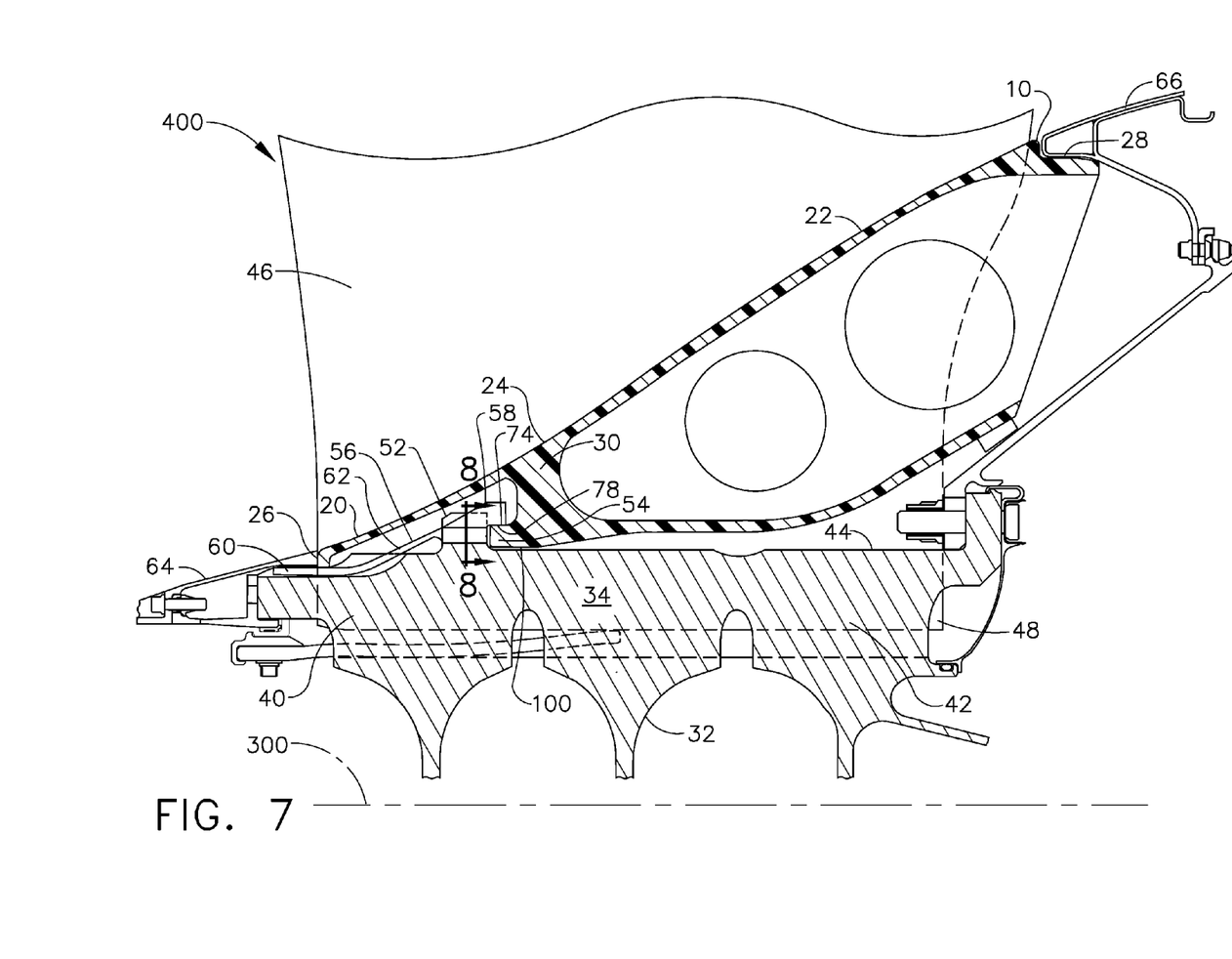
FIG. 7 is a cross-sectional view of a gas turbine engine bypass fan with another alternative exemplary embodiment of a gas turbine engine rotor assembly.

FIG. 7 illustrates a cross-sectional view of a gas turbine engine bypass fan 222 with another alternative exemplary embodiment of a gas turbine engine rotor assembly 400. In this exemplary embodiment, the mounting feature 30 has engagement tang 54 extending radially inward and axially forward. Mounting feature 30 having further a radially inward clearance surface 100, and radially outward mounting surface 78, both approximately parallel with the axis of rotation 300.

Figure 8:
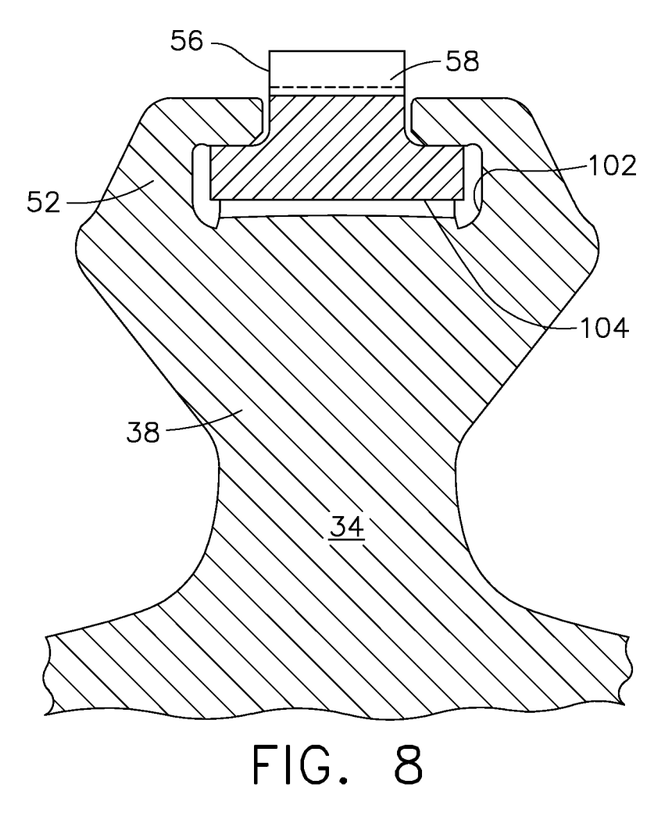
FIG. 8 is cross-sectional view of the disk and attachment features for FIG. 7 through aft looking forward section 8-8.

Once again referring to FIG. 7, near the forward disk end 40, the outer surface of the rim 44 is raised radially outward to form a disk post hook 52. In this alternative exemplary embodiment, as shown in FIG. 8, an aft looking forward sectional view at the disk post hook 52 taken from section 8-8 of FIG. 7, where the disk post hook 52 has an axial t-slot 102 that projects axially along the rim 34 radially above the disk rim outer surface 44. A captured clip 56 having an engagement end 58, a captured end 60, and bridge portion 62, connecting the captured end 60 to the engagement end 58, is located radially outward of the outer surface of the rim 44 and radially inward of the forward portion 20 of the fan platform 10. As shown in FIG. 7 and FIG. 8 the engagement end has a radially inward mounting surface 74 and an axial t-shaped section 104 complimentary to the axial t-slot 102 of disk hook 52. The engagement end 58 is assembled with the engagement tang 54 and disk post hook 52 thereby aligning and coupling the fan platform 10 to the disk 32.

The radial assembly gap between the radially inward clearance surface and the outer surface of the rim 44 can range between about 0.013 cm to 0.38 cm, as desired, with this exemplary embodiment being about 0.13 cm. As desired, the circumferential shape of the engagement tang 54 and mating engagement end 58, along with the radial assembly gap, permit the platform 10 to move circumferentially relative to the disk 32 during impact and dynamic loading events. Additionally, the portions of the fan platform 10 interfacing with the forward support 64 and aft support 66, as well as the mounting feature 30, are all adapted to be fastenerless and also thereby permit circumferential relative movement with the disk 32 during impact and dynamic loading events.

In the alternative exemplary embodiments of a gas turbine engine rotor assembly 400 shown in FIG. 6 and FIG. 7, the captured end 60 projects axially forward and radially below forward interface surface 26, terminating just aft of the axially forward-most edge of the disk forward end 40. The captured end 60 rests on the disk outer surface 44 and is captured radially by the forward support 64 and forward portion 20. Alternative methods of retaining the captured end 60 include, for example, extending the captured end 60 forward and radially inward, thereby nesting the captured end 60 on the axially forward-most edge of the disk forward end 40. Such an extended captured end 60 could again be retained radially by the forward support 64 and forward portion 20 or alternatively fastened to the disk forward end 40

Figure 9:
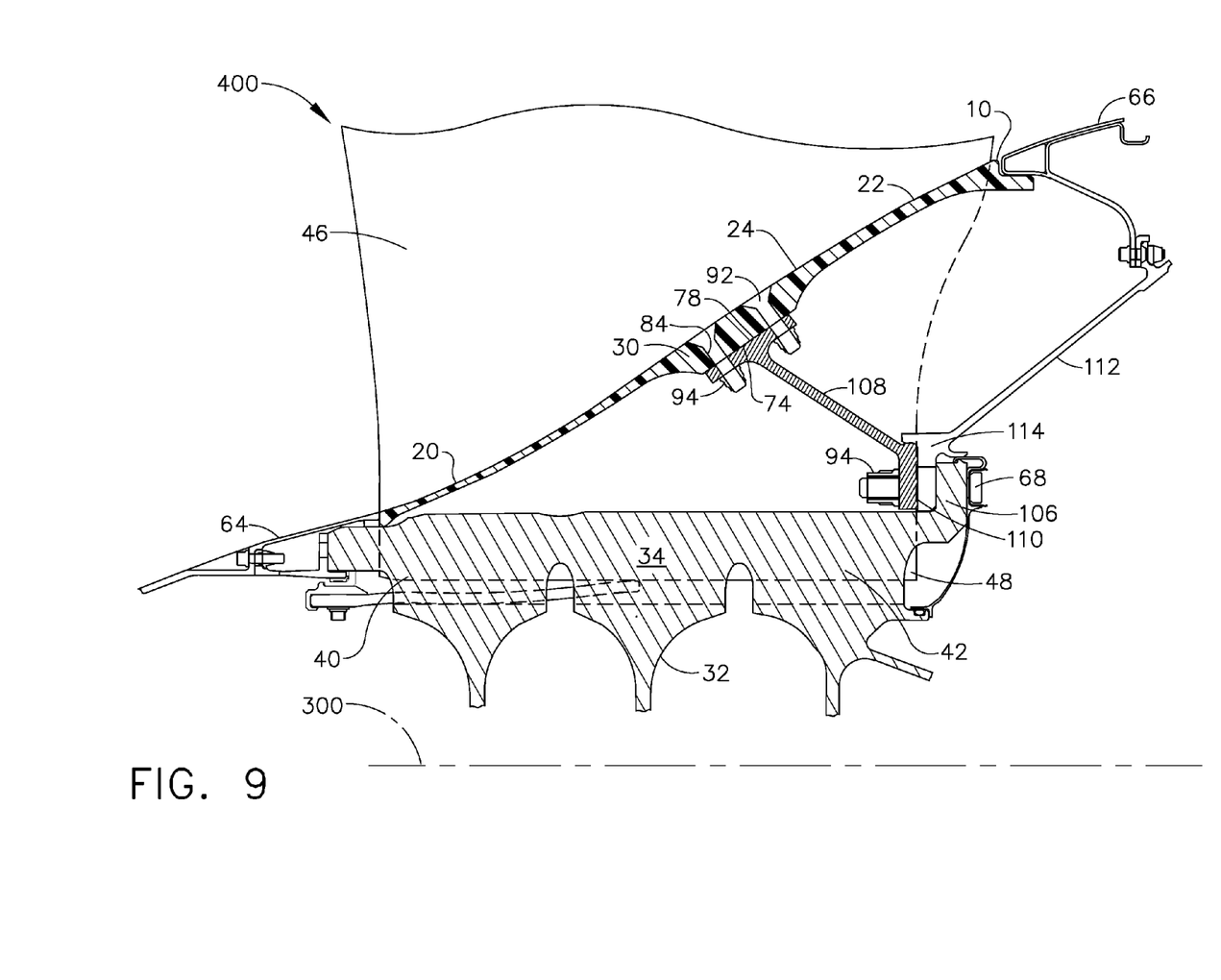
FIG. 9 is a cross-sectional view of a gas turbine engine bypass fan with another alternative exemplary embodiment of a gas turbine engine rotor assembly.

FIG. 9 illustrates a cross-sectional view of a gas turbine engine bypass fan 222 with another alternative exemplary embodiment of a gas turbine engine rotor assembly 400. In this exemplary embodiment, the mounting feature 30 has increased section thickness in comparison to the forward portion 20 and aft portion 22 and a pair of countersunk holes 84 running through the mounting feature 30. The countersunk holes 84 centerlines are approximately orthogonal to the radially outer surface of the transition portion 24. Along its maximum section thickness, mounting feature 30 further includes a radially inward mounting surface 74 approximately orthogonal to the centerlines of the countersunk holes 84.

Again referring to FIG. 9, disk 32 has a forward disk end 40, and an aft disk end 42. At the aft disk end 42 each disk post 38 has a vertical mount 106. Paired with each mounting feature 30 is an attachment member 50, having a radially outward mounting surface 78 complimenting the radially inward mounting surface 74, a truss arm 108, and an aft mounting surface 110. A booster spool 112, circumscribing axis of rotation 300, is located radially outward of disk 32 and generally aft of both the aft disk end 42 and attachment members 50, and has a vertical bolting flange 114. The aft mounting surface 110 of attachment member 50 is matched up with a vertical mount 106, and vertical bolting flange 114. Then fastener 68 is inserted through the vertical mount 106, vertical bolting flange 114, and attachment member 50, and is threaded into a nut 94. Continuing the assembly, platform 10 is presented to attachment member 50, and countersunk fasteners 92 are passed through mounting feature 30 and attachment member 50 and threaded into nuts 94, thereby aligning and affixing the fan platform 10 to the attachment member 50 and coupling them to the disk 32 by way of the aft mounting surface 110 and vertical mount 106.

The combination of the truss arm 108, aft portion 22, aft support 66, and booster spool 112, when viewed in section, roughly form a four-sided box structure that efficiently carries the majority of the mass of the platform 10 during operation of the rotor assembly 400. This efficient box structure permits the interface of the fan platform 10 with the forward support 64 to be fastenerless and eliminates the need for additional disk complexity on the disk rim outer surface 44, ultimately reducing platform weight, assembly complexity, and assembly time while permitting a low radius hub design.

Figure 10:
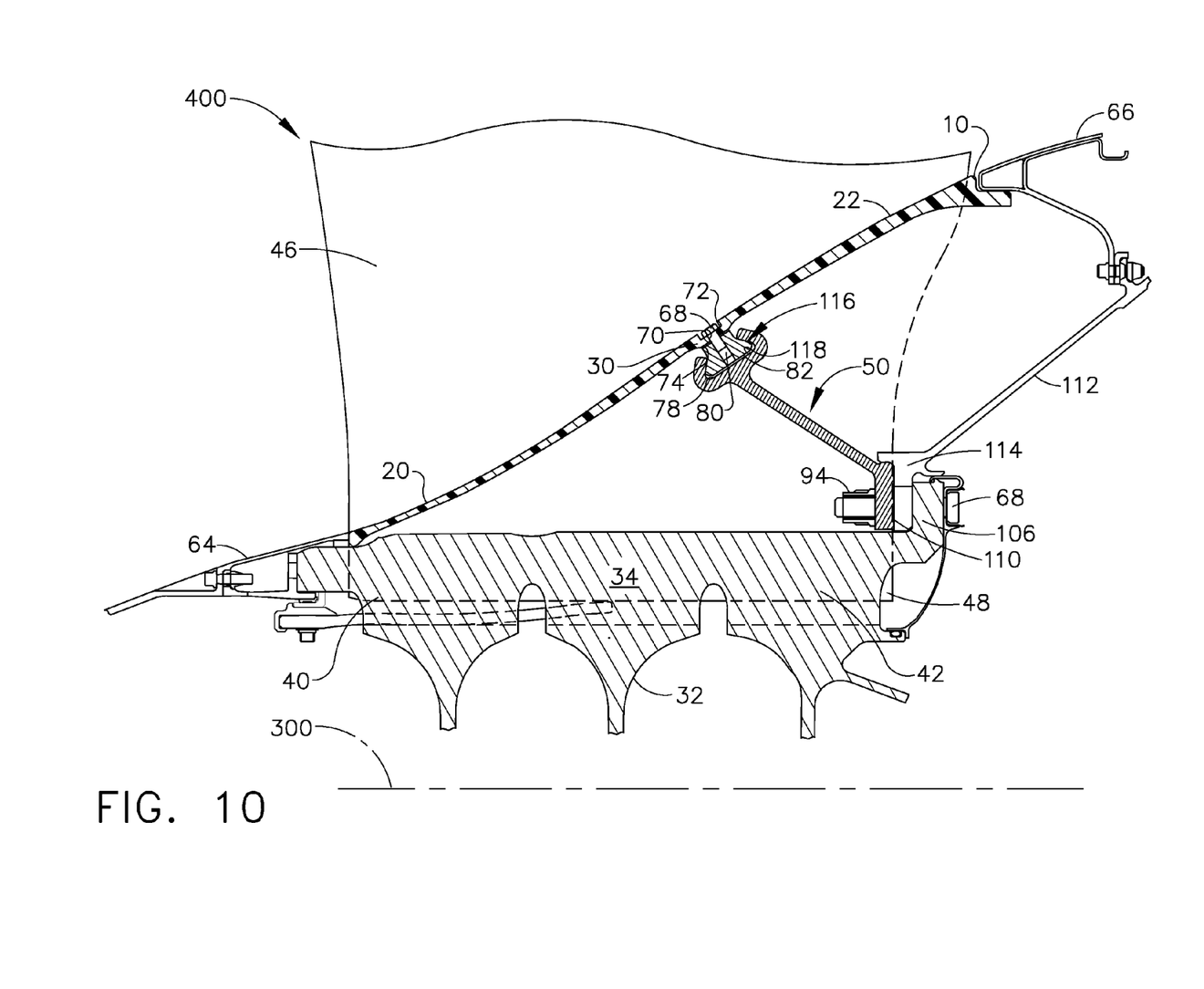
FIG. 10 is a cross-sectional view of a gas turbine engine bypass fan with another alternative exemplary embodiment of a gas turbine engine rotor assembly.

Referring now to FIG. 10, illustrated is a cross-sectional view of a gas turbine engine bypass fan 222 with yet another alternative exemplary embodiment of a gas turbine engine rotor assembly 400. In this exemplary embodiment, the mounting feature 30 again has increased section thickness in comparison to the forward portion 20 and aft portion 22, a clearance hole 70 running through the mounting feature 30, and a counterbore 72. The clearance hole 70 and counterbore 72 are concentric and their shared centerline is approximately orthogonal to the radially outer surface of the transition portion 24. Along its maximum section thickness, mounting feature 30 further includes a radially inward mounting surface 74 approximately orthogonal to the centerline of the clearance hole 70. In this exemplary embodiment, matched with each mounting feature 30 and attachment member 50 is a separable dovetail insert 116. The insert 116 has a mounting face 118 mating to the radially inward mounting surface 74, a staked threaded insert 80, and a dovetail shaped radially inboard end 82. The radially outward mounting surface 78 of attachment member 50 is shaped as a circumferential dovetail slot complimentary to the dovetail shaped radially inboard end 82 of insert 116. The insert 116 is placed into the attachment member 50, mating the dovetail shape features, and then a fastener 68, a shear bolt, passes through the mounting feature 30 and is threaded into threaded insert 80, thereby aligning and affixing the fan platform 10 to the insert 116 and coupling them to the attachment member 50 by way of the dovetail shaped radially inboard end 82 and radially outward mounting surface 78 of attachment member 50.

The same efficient box structure as in described in FIG. 9 is present in this exemplary embodiment, eliminating the need for additional disk complexity on the disk rim outer surface 44, reducing platform weight, assembly complexity and time and once again permitting a low radius hub design. The radial assembly gap between the dovetail shaped radially inboard end 82 and radially outward mounting surface 78 of attachment member 50 can range between about 0.013 cm to 0.38 cm, as desired, with this exemplary embodiment being about 0.13 cm. Additionally, as desired, the circumferential shape of dovetail shaped radially inboard end 82 and radially outward mounting surface 78, along with the radial assembly gap, permit the platform 10 to move circumferentially relative to the disk 32 during impact and dynamic loading events. In this exemplary embodiment, the interfaces of the fan platform 10 with the forward support 64 and aft support 66 are both fastenerless also permit circumferential relative movement with the disk 32 during impact and dynamic loading events.

Descriptions of the assembly for securing the mounting feature 30 to the fan disk 32 using attachment members 50, captured clips 56, or alternatively attachment members 50 and separable inserts 116, are included in the details of each exemplary embodiment of rotor assembly 400 above. To assemble the larger rotor assembly 400, first an assembly of the fan disk 32 and booster spool 112 is provided. Then an aft support 66 is presented and fastened to the booster spool 112. Next a fan blade 46 is inserted into a dovetail slot 36 of the fan disk 32, followed by inserting a second fan blade 46 into a neighboring disk slot 36. Then a fan platform 10 is installed circumferentially between the fan blades 46 and radially above the disk 32, positioned axially by the aft support 66, and generally aligned with the disk 32. The mounting feature 30 of the fan platform 10 is then secured to the disk 32. This sequence, starting with the introduction of a fan blade 46, is then repeated for subsequent dovetail slots 36 until the full annulus of the fan disk 32 is populated with fan blades 46, mounting features 30 and associated fan platforms 10. Finally, a forward support 64 is secured on the forward disk end 49 of the fan disk 32.

Suitable manufacturing methods and materials for the individual components of the exemplary embodiments of the rotor assembly 400 are generally known in the aerospace industry and include, for example, general aerospace manufacturing methods such as machining of steel, aluminum, or titanium plate as well as autoclave processing and compression molding of polymer composites. Suitable assembly specifications such as bolt torques, lubrication, and the like, include those generally known in the aerospace industry.

The foregoing description of the embodiments of the invention is provided for illustrative purposes only and is not intended to limit the scope of the invention as defined in the appended claims. Other modifications of the invention shall be apparent to those skilled in the art from the teachings herein, and it is, therefore, desired to be secured in the appended claims all such modifications as fall within the true spirit and scope of the invention.

What is claimed is:

1. A gas turbine engine rotor assembly comprising:
   a disk having a disk rim, a plurality of dovetail slots, and a plurality of disk posts, each disk post having at least one disk post hook, wherein the disk posts are circumferentially disposed around the rim and the dovetail slots are disposed circumferentially between disk posts;
   a plurality of fan blades having dovetail roots disposed in the dovetail slots,
   a plurality of fan platforms, each of the fan platforms having a forward portion having a forward interface surface facing axially forward, an aft portion having an aft interface surface facing radially outward, and a transition portion having at least one mounting feature, the mounting feature having at least one engagement tang, wherein the transition portion is connectively disposed between the forward portion and aft portion, wherein the fan platforms are circumferentially disposed between the fan blades; and
   a plurality of captured clips, each captured clip having an engagement end, wherein each of the captured clips are circumferentially disposed between the fan blades and radially disposed between the disk and the fan platform, whereby the engagement end couples the engagement tangs to the disk post hooks.

2. A gas turbine engine rotor assembly in accordance with claim 1, whereby the captured clips have shapes which permit relative circumferential motion between the fan platform and the disk posts.

3. A gas turbine engine rotor assembly in accordance with claim 1, wherein the forward portion and aft portion are adapted to be fastenerless.

4. A gas turbine engine comprising a bypass fan, said bypass fan including a gas turbine engine rotor assembly comprising:
- a disk having a disk rim, a plurality of dovetail slots, and a plurality of disk posts, wherein the disk posts are circumferentially disposed around the rim and the dovetail slots are disposed circumferentially between disk posts;
- a plurality of fan blades having dovetail roots disposed in the dovetail slots;
- a plurality of fan platforms, each of the fan platforms having a forward portion having a forward interface surface facing axially forward, an aft portion having an aft interface surface facing radially outward, and a transition portion having at least one mounting feature, wherein the transition portion is connectively disposed between the forward portion and aft portion, wherein the fan platforms are circumferentially disposed between the fan blades; and
- a plurality of attachment members, wherein each of the attachment members are circumferentially disposed between the fan blades and connectively disposed between the platform transition portions and disk posts, the attachment members comprising a plurality of captured clips, each captured clip having an engagement end, wherein each of the captured clips are circumferentially disposed between the fan blades and radially disposed between the disk and the fan platform, whereby the engagement end couples the engagement tangs to the disk post hooks.

5. A gas turbine engine in accordance with claim 4, wherein the mounting features and the attachment members are adapted to receive at least one fastener.

6. A gas turbine engine in accordance with claim 4, wherein the attachment members have shapes which permit relative circumferential motion between the fan platform and the disk posts.

7. A gas turbine engine in accordance with claim 4, wherein the forward portions and aft portions are adapted to be fastenerless.

8. A gas turbine engine comprising a bypass fan, said bypass fan including a gas turbine engine rotor assembly comprising:
- a disk having a disk rim, a plurality of dovetail slots, and a plurality of disk posts, each disk post having at least one disk post hook, wherein the disk posts are circumferentially disposed around the rim and the dovetail slots are disposed circumferentially between disk posts;
- a plurality of fan blades having dovetail roots disposed in the dovetail slots,
- a plurality of fan platforms, each of the fan platforms having a forward portion having a forward interface surface facing axially forward, an aft portion having an aft interface surface facing radially outward, and a transition portion having at least one mounting feature, the mounting feature having at least one engagement tang, wherein the transition portion is connectively disposed between the forward portion and aft portion, wherein the fan platforms are circumferentially disposed between the fan blades; and
- a plurality of captured clips, each captured clip having an engagement end, wherein each of the captured clips are circumferentially disposed between the fan blades and radially disposed between the disk and the fan platform, whereby the engagement end couples the engagement tangs to the disk post hooks.

9. A gas turbine engine in accordance with claim 8, whereby the captured clips have shapes which permit relative circumferential motion between the fan platform and the disk posts.

10. A gas turbine engine in accordance with claim 8, wherein the forward portion and aft portion are adapted to be fastenerless.

11. A method of assembling a gas turbine engine rotor assembly, the method comprising the steps:
- a) providing a fan disk and booster spool assembly;
- b) installing an aft support on the booster spool;
- c) installing a fan blade into the fan disk;
- d) installing a fan blade into the fan disk adjacent to the fan blade in step c);
- e) installing a fan platform including a mounting feature between the adjacent fan blades;
- f) securing the mounting feature to the fan disk using a captured clip;
- g) repeating steps c) through f) until the fan disk is populated with fan blades and secured mounting features; and
- h) installing a forward support onto the fan disk.

* * * * *